(12) United States Patent
Jager

(10) Patent No.: US 10,753,486 B2
(45) Date of Patent: Aug. 25, 2020

(54) THERMOSTATIC CARTRIDGE FOR CONTROLLING HOT AND COLD FLUIDS TO BE MIXED

(71) Applicant: VERNET, Ollainville (FR)

(72) Inventor: Frédéric Jager, Saint-Cheron (FR)

(73) Assignee: VERNET, Ollainville (FR)

( * ) Notice: Subject to any disclaimer, the term of this patent is extended or adjusted under 35 U.S.C. 154(b) by 165 days.

(21) Appl. No.: 15/776,048

(22) PCT Filed: Nov. 10, 2016

(86) PCT No.: PCT/EP2016/077217
§ 371 (c)(1),
(2) Date: May 14, 2018

(87) PCT Pub. No.: WO2017/081127
PCT Pub. Date: May 18, 2017

(65) Prior Publication Data
US 2018/0328500 A1    Nov. 15, 2018

(30) Foreign Application Priority Data
Nov. 13, 2015   (FR) ..................... 15 60894

(51) Int. Cl.
*F16K 11/044*      (2006.01)
*G05D 23/13*       (2006.01)
(Continued)

(52) U.S. Cl.
CPC .............. *F16K 11/044* (2013.01); *F01P 7/16* (2013.01); *F16K 31/002* (2013.01); *G05D 23/1353* (2013.01)

(58) Field of Classification Search
CPC ........ F16K 11/044; F16K 31/002; F01P 7/16; G05D 23/1353
See application file for complete search history.

(56) References Cited

U.S. PATENT DOCUMENTS 4,321,719 A * 3/1982 Mollura ............... A47C 27/085
156/309.6
5,927,597 A   7/1999 Bolgar
(Continued)

FOREIGN PATENT DOCUMENTS

CN     101258349 B    4/2011
CN     105009016 B    4/2017
(Continued)

OTHER PUBLICATIONS

Draber et al., Thermostatic Single-Control Cartridge, May 18, 2015, WO2015086749A1, Whole Document (Year: 2015).*
(Continued)

*Primary Examiner* — Larry L Furdge
(74) *Attorney, Agent, or Firm* — Knobbe, Martens, Olson & Bear, LLP

(57) ABSTRACT

A cartridge is disclosed that has a base with a first base portion with a first inlet opening for a first of the cold and hot fluids to be mixed, and a second base portion with a second inlet opening for the second fluid and an outlet opening for a mixture of the cold and hot fluids. The cartridge also has a thermostatic element, as well as a control spool for controlling the temperature of the mixture. The control spool defines a spool axis that is parallel to the base axis. In order to maximize the flow sections of the fluids through the base, the spool axis is offset relative to the base axis.

13 Claims, 7 Drawing Sheets

(51) Int. Cl.
*F16K 31/00* (2006.01)
*F01P 7/16* (2006.01)

(56) References Cited

U.S. PATENT DOCUMENTS

| | | | |
|---|---|---|---|
| 8,740,097 B2 | 6/2014 | Platet | |
| 9,342,080 B2 | 5/2016 | De Silva | |
| 9,823,671 B2 | 11/2017 | Vernet | |
| 9,958,881 B2 | 5/2018 | Draber | |
| 2008/0216909 A1* | 9/2008 | Kim | F16K 11/0743 |
| | | | 137/896 |
| 2016/0011606 A1* | 1/2016 | Draber | G05D 23/1346 |
| | | | 236/12.21 |

FOREIGN PATENT DOCUMENTS

| | | |
|---|---|---|
| FR | 3 003 046 A1 | 9/2014 |
| FR | 2 983 985 B1 | 12/2014 |
| WO | WO 1996/026475 A1 | 8/1996 |
| WO | WO 2009/116254 A1 | 9/2009 |
| WO | WO 2010/072966 A1 | 7/2010 |
| WO | WO 2014/135614 A2 | 9/2014 |
| WO | WO 2015/052098 A1 | 4/2015 |
| WO | WO 2015/086749 A1 | 6/2015 |
| WO | WO2015086749 A1 * | 6/2015 |

OTHER PUBLICATIONS

International Search Report & Written Opinion, dated Feb. 20, 2017, in International Application No. PCT/EP2016/077217.

* cited by examiner

US 10,753,486 B2

THERMOSTATIC CARTRIDGE FOR CONTROLLING HOT AND COLD FLUIDS TO BE MIXED

PRIORITY AND CROSS REFERENCE TO RELATED APPLICATIONS

This application is the U.S. National Phase Application under 35 U.S.C. § 371 of International Application No. PCT/EP2016/077217, filed Nov. 10, 2016, designating the U.S. and published as WO 2017/081127 A1 on May 18, 2017, which claims the benefit of French Application No. FR 1560894, filed Nov. 13, 2015. Any and all applications for which a foreign or a domestic priority is claimed is/are identified in the Application Data Sheet filed herewith and is/are hereby incorporated by reference in their entireties under 37 C.F.R. § 1.57.

FIELD

The present invention relates to the field of thermostatic cartridges for mixing liquids.

SUMMARY

The present disclosure relates to a thermostatic cartridge for controlling hot and cold fluids to be mixed,

BRIEF DESCRIPTION OF THE DRAWINGS

The invention will be better understood upon reading the following description, provided solely as an example and done in reference to the drawings, in which.

DETAILED DESCRIPTION

Figure 1:
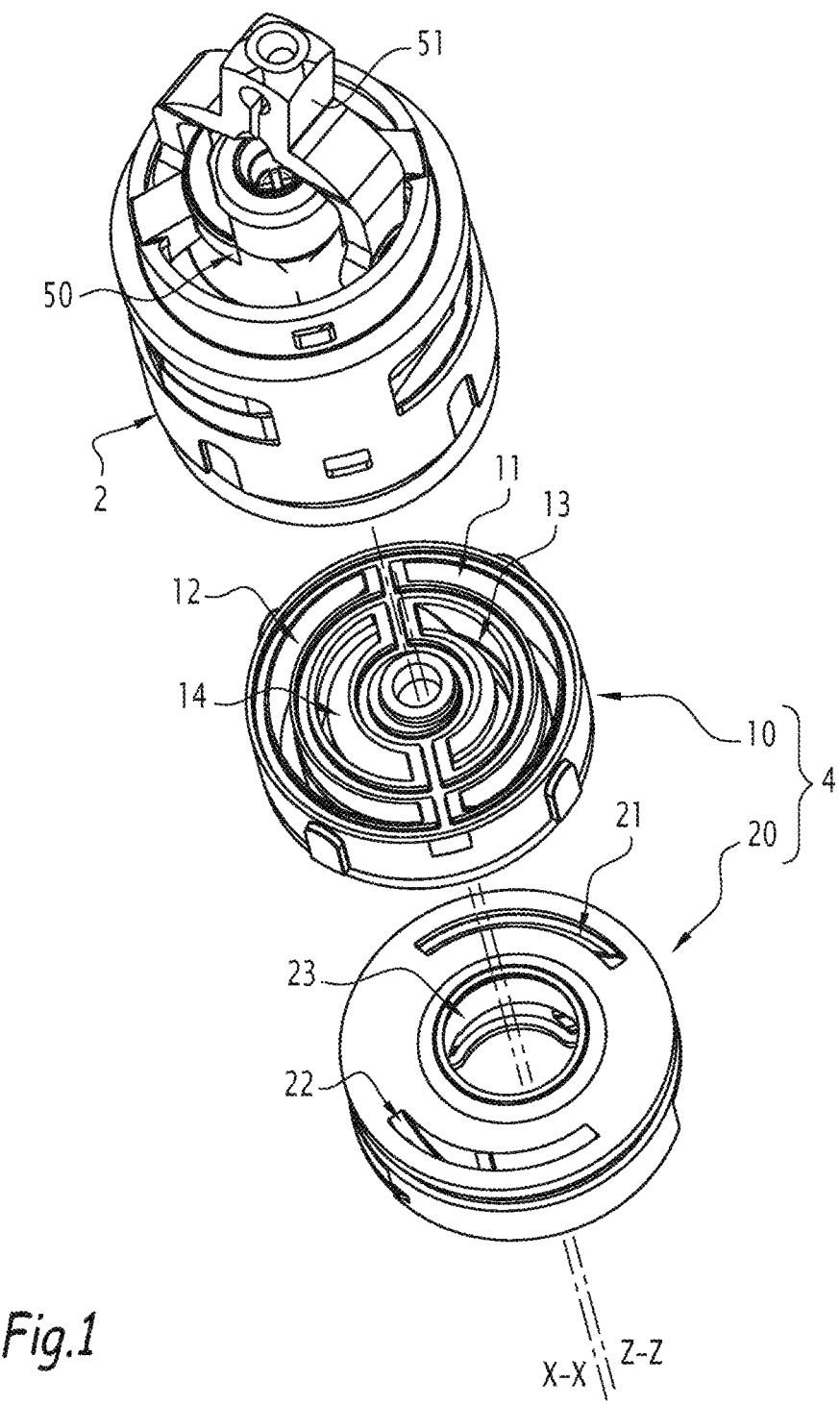
FIG. 1 is an exploded perspective view of a thermostatic cartridge according to the invention.

The present invention relates to a thermostatic cartridge for controlling hot and cold fluids to be mixed, in particular hot water and cold water within a sanitation facility.

Such a cartridge comprises a base in which the hot and cold fluids circulate until being mixed therein before leaving it. This base is designed to be mounted inside a tap, or more generally, a sanitation device, which is supplied by the hot and cold fluids and which delivers the mixture of these fluids: the base therefore has a constrained outer geometry, regarding both its shape and its dimensions, since it must adjust to the inner space of a body of this sanitation device, dedicated to the mounting of the base. Typically, the base has a cylindrical outer geometry with a circular base, the diameter of which is for example between 35 and 40 mm. Considering that the central axis of the base, defined by its outer geometry, extends vertically, the invention examines the usual configuration in which the fluids flow in the base globally from top to bottom, the hot and cold fluids entering it by its upper side, via separate inlet orifices, located at a distance from the central axis, while the mixture leaves it by its lower side, via an outlet orifice, generally centered on the central axis. In practice, since the inlet for fluids supplying the cartridge is usually located below the base, the base also often delimits riser channels for these fluids, which extend at a distance from the central axis, directly connecting the lower side to the upper side of the base: downstream from these riser channels, the fluids are sent downward in the aforementioned inlet orifices, the flow rate of the fluids thus sent being commanded by ceramic discs, which are generally integrated into the cartridge and which are arranged above the upper face of the base.

Inside the base, the hot and cold fluids that enter it are controlled by a moving spool, secured to the body of a thermostatic element whose piston is connected to the fixed base. This spool and this thermostatic element are arranged concentrically in a free inner space of the base, while being centered on the central axis of the base. The spool is movable along this central axis inside the free space of the base so as to inversely vary the flow sections of the fluids entering the base through the upper side of the latter, in order to mix these fluids in corresponding variable proportions to obtain, downstream from the spool, the mixture that flows along a heat-sensitive part of the thermostatic element before leaving the base through its lower side. By modifying the axial position of the piston relative to the base, generally using an ad hoc adjusting mechanism, the thermostatic control temperature is set, i.e., the equilibrium temperature around which the temperature of the mixture is controlled. It is even possible to have only one lever to control both this mechanism for controlling the temperature and means for adjusting the flow rate of the hot and cold fluids sent to the spool, such as the aforementioned ceramic discs: in this case, the thermostatic cartridge is described as single-control. WO 96/26475 provides one example of this.

The maximum flow rates of hot and cold fluids that may pass through the base of the cartridge are limited by the flow sections of the different orifices and channels of the base and by the flow sections of the passages between the base and the spool, the pressure loss at these passages being non-negligible. The flow section of the passages between the base and the spool depends on the travel of the spool between its two extreme high and low positions, in each of which the flow of one of the hot and cold fluids is completely closed in favor of the maximum flow of the other fluid: in practice, this travel is about a millimeter, or even less, within cartridges with standard dimensions, and it may not be increased without losing the control quality of the temperature of the mixture. The flow section between the passages of the base and the spool also depends on the radial dimension of these passages, which follows directly from the outer diameter of the spool. Lastly, the flow section of the passages between the base and the spool depends on the peripheral dimension of these passages, which is directly related to the span of these passages around the spool: to prevent the peripheral portions of the spool alone from receiving the hot and cold fluids to be regulated, WO 96/26475, cited above, has proposed to hollow out, inside the base of the cartridge, upper and lower peripheral grooves, making it possible to distribute the fluid around the spool, the inlet orifices for the hot fluid and the cold fluid respectively emerging in these grooves. However, in practice, this solution tends to reduce the diameter of the inner free space of the base significantly, in favor of its thickness to hollow the aforementioned grooves therein, which greatly limits the outer diameter of the spool and therefore limits the maximum fluid flow rates that can be controlled by that spool. Furthermore, this solution is expensive to implement, since manufacturing the base is complex: in the event the base is made by molding plastic material, the molding core necessarily has a large diameter to accommodate the presence of retractable pins that are essential to mold the aforementioned grooves, as well as their junction with the hot fluid and cold fluid intake orifices.

More recently, WO 2014/135614 proposed to distribute the hot and cold fluids around the spool not by two grooves defined solely by the base, but simultaneously by an upper distribution channel, which is partially delimited by a dedicated part of the spool, and a lower distribution channel, which is partially delimited by a part fixedly attached in the outlet orifice of the base, in particular the part against which the return spring associated with thermostatic element bears. The molding constraints of the base are reduced as a result, while making it possible to avoid undercuts for the molding-stripping of these distribution channels: it is thus possible to produce the base in the form of a single piece that is stripped axially, without using retractable pins in the molding core. This solution makes it possible to cause greater flow rates to flow through the base to the spool, but the outer diameter of the latter remains limited, in particular by the presence of the fluid intake pipe supplying the lower distribution channel.

The aim of the present invention is to propose a cartridge of the aforementioned type, the base of which remains simple and cost-effective to manufacture, while making it possible to favor the flow of high fluid flow rates.

To that end, the invention relates to a thermostatic cartridge for controlling hot and cold fluids to be mixed, comprising:
- a base, which defines a base axis on which an outer peripheral face of the base is centered, and which includes first and second base parts that follow one another along the base axis, each of the first and second base parts having a first axial face turned away from the other base part, this first base part delimiting a first inlet orifice for a first of the cold and hot fluids, as well as a second inlet orifice for the second fluid, the first and second inlet orifices emerging separately on the first face of the first base part, and the second base part delimiting an outlet orifice for a mixture of the cold and hot fluids, emerging on the first face of the second base part;
- a thermostatic element, which includes a piston, connected to the base, and a body, containing a thermodilatable material and positioned in the outlet orifice, the piston and the body being movable relative to one another substantially parallel to the base axis under effect of an expansion of the thermodilatable material; and
- a spool for regulating the temperature of the mixture, which defines a spool axis both parallel to the base axis and offset relative to the base axis, which has first and second opposite axial faces, respectively turned toward the first face of the first and second base parts, and which is connected to the thermostatic element to be moved substantially along the spool axis inside the first base part so as to inversely vary respective flow sections of a first passage for the first fluid and of a second passage for the second fluid, wherein the first passage is supplied by the first inlet orifice, extends around the spool axis while being centered on this spool axis, and is axially delimited between the first face of the spool and the first base part, and wherein the second passage is supplied by the first inlet orifice, extends around the spool axis while being centered on this spool axis, and is axially delimited between the second face of the spool and the second base part.

One of the ideas at the base of the invention is to depart from the traditional concentric design between the base and the thermostatic control assembly formed by the spool and the thermostatic element. This traditional concentric design is associated with the technical prejudice according to which the flow sections of the fluids through the base can only be optimized by distributing the circulation of the fluids regularly, or even symmetrically, relative to the central axis of the base. The invention goes against this prejudice by off-centering the spool and the thermostatic element relative to the base, i.e., by offsetting two parallel axes relative to one another, namely a base axis, which is defined by the outer periphery of the base and which is therefore imposed by the body of the sanitation device in which the cartridge is to be installed, and a spool axis, along which the spool moves under the driving action of the thermostatic element and on which the fluid passages between the spool and the base are centered. There is reason to understand that the invention does not relate to the existence, implicitly known in the art, of an assembly play inherent to the cartridge, causing an alignment between the base axis and the spool axis that is not strictly exact, but that the invention provides for a deliberate and predetermined offset between the base axis and the spool axis, this offset for example being equal to several tenths of a millimeter for a base having an outer diameter from 35 to 40 mm. Owing to the off-centering of the spool and the thermostatic element inside the base, it is possible to optimize the flow sections of the inlet orifice for the hot fluid and the inlet orifice for the cold fluid, while increasing the outer diameter of the spool: in the typical case where these inlet orifices are located opposite one another relative to the base axis, the invention makes it possible to offset the spool axis toward the first inlet orifice, i.e., the inlet orifice supplying that of the two passages between the spool and the base that is highest when one considers that the base and spool axes are vertical and that the face of the base, on which the inlet orifices emerge, faces upward: by thus offsetting the spool axis toward the first inlet orifice and keeping the flow section of the second orifice unchanged, the outer diameter of the spool can be increased, up to twice the value of the offset between the spool axis and the base axis, the decrease in the flow section of the first inlet orifice having no impact on the maximum allowable flow rate of the first fluid because, in the concentric design of the prior art, the flow section of the first inlet orifice is typically oversized relative to that of the second inlet orifice, since, unlike the second inlet orifice, the first inlet orifice does not need to extend downward, while laterally bypassing the spool, until passing between the lower face of this spool and the base. More globally, it will be understood that the invention makes it possible, if applicable by rebalancing the flow sections of the two inlet orifices, to increase the outer diameter of the spool by off-centering the latter relative to the base axis, which, all other things being equal, increases the flow section of the two passages between this spool and the base and therefore increases the maximum acceptable fluid flow rates by the cartridge according to the invention.

According to one embodiment that will be outlined below, the off-centering of the spool and the thermostatic element advantageously takes advantage of the possibility of making the upper and lower parts of the base, in two separate parts, which are axially superimposed on one another and which are permanently fastened to one another at a junction interface, which is formed by axially applying their respective axial faces turned toward one another against one another, and which is provided to be sealed. The second fluid can then be distributed around the spool by a distributing channel formed at the junction between the upper and lower base parts: in this way, this distribution channel advantageously has a much larger flow section than if the base was made in a single piece. In particular, this distribution channel can be radially very extensive, without worrying about molding and stripping constraints of the upper base part, with the understanding that, after fastening of the two base parts to one another, this distribution channel is axially closed by the lower base part. Furthermore, the second inlet orifice can also be provided with a position greatly radially offset relative to the base axis, which allows greater off-centering of the spool relative to the base axis, in particular in the direction opposite the second inlet orifice, and therefore a greater possible increase in the outer diameter of the spool.

According to additional advantageous features of the cartridge according to the invention:

- An offset between the spool axis and the base axis is equal to at least one one-hundredth of a diameter of the outer peripheral face of the base.
- The first inlet orifice and the second inlet orifice are opposite one another relative to the base axis, and in that the spool axis is offset, relative to the base axis, toward the first inlet orifice.
- The first inlet orifice and the second inlet orifice extend, around the spool axis and in a centered manner on this spool axis, over about 180° and in a diametrically opposite manner.
- The first inlet orifice and the second inlet orifice have respective minimal flow sections that are substantially equal.
- The first and second base parts are separate from one another and are axially superimposed fixedly on one another, such that second axial faces respectively of the first base part and the second base part, which are respectively opposite their first face, are applied axially against one another and thus include respective parts, in axial contact with one another, which form a junction interface between the first and second base parts, which is sealed and at which a distribution channel for the second fluid around the spool is formed between the first and second base parts.
- The first base part inwardly has a first substantially cylindrical surface, which is centered on the spool axis, on which the first inlet orifice radially emerges and which delimits a channel for distributing the first fluid around the spool, and the first base part inwardly has a substantially cylindrical second surface, which is centered on the spool axis, a diameter of which is strictly larger than a diameter of the first substantially cylindrical surface, and which extends axially from the second face of the first base part toward the first face of this first base part, while successively delimiting the distribution channel for the second fluid and the second inlet orifice.
- The second inlet orifice includes a connecting part between its mouth on the first face of the first base part and the distribution channel for the second fluid, this connecting part of the second inlet orifice being radially further away from the spool axis than said mouth.
- The first and second base parts are each made from a plastic part and the plastic materials making up the respective parts of the second face of the first base part and the second face of the second base part, which form the junction interface, are welded to one another so as to seal this junction interface.
- The plastic materials making up the respective parts of the second face of the first base part and the second face of the second base part, which form the junction interface, are welded to one another by laser welding.
- The respective parts of the second face of the first base part and the second face of the second base part, which form the junction interface, are provided with seals and/or sealing gaskets so as to seal this junction interface.
- A flow channel for the first fluid from the first face of the second base part to the first face of the first base part is formed jointly by a first flow channel of the first fluid, delimited by the first base part and connecting the first and second faces of the first base part to one another, and by a second flow channel for the first fluid, delimited by the second base part and connecting the first and second faces of the second base part to one another, these first and second flow channels of the first fluid being directly connected to one another while emerging in one another at the junction interface, and a flow channel for the second fluid from the first face of the second base part to the first face of the first base part is formed jointly by a first flow channel of the second fluid, delimited by the first base part and connecting the first and second faces of the first base part to one another, and by a second flow channel for the second fluid, delimited by the second base part and connecting the first and second faces of the second base part to one another, these first and second flow channels of the second fluid being directly connected to one another while emerging in one another at the junction interface.
- The junction interface is transverse to the axis.
- The junction interface is substantially planar and extends substantially perpendicular to the axis.

FIGS. 1 to 7 show a thermostatic cartridge 1 that is arranged along a main axis X-X. This cartridge is suitable for equipping a faucet mixing hot water and cold water, not shown as such in the figures, or more generally, for equipping a sanitary facility.

Figure 3:
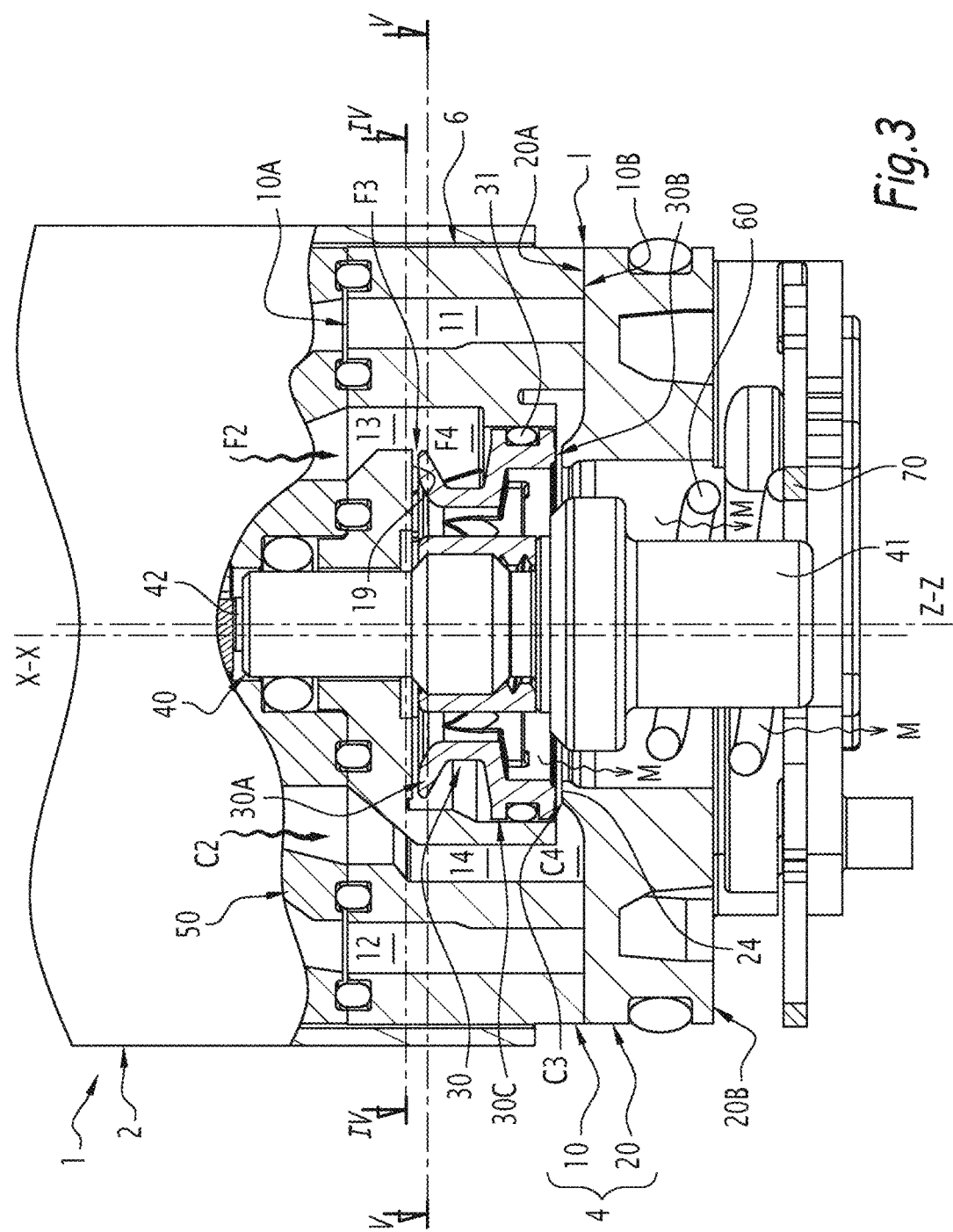
FIG. 3 is a partial longitudinal sectional view of the cartridge of FIG. 1 in the assembled state.
Figure 6:
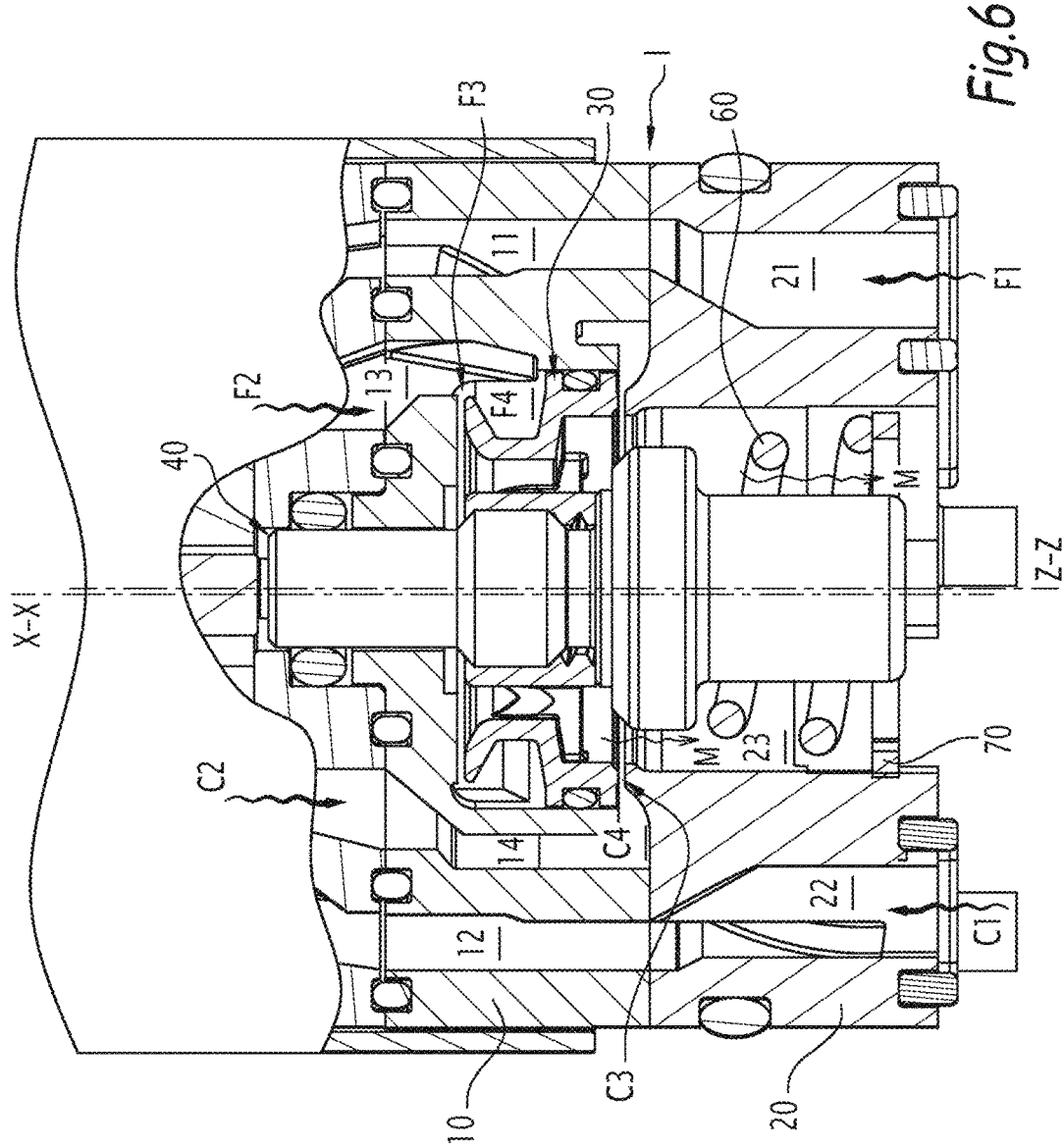
Figure 7:
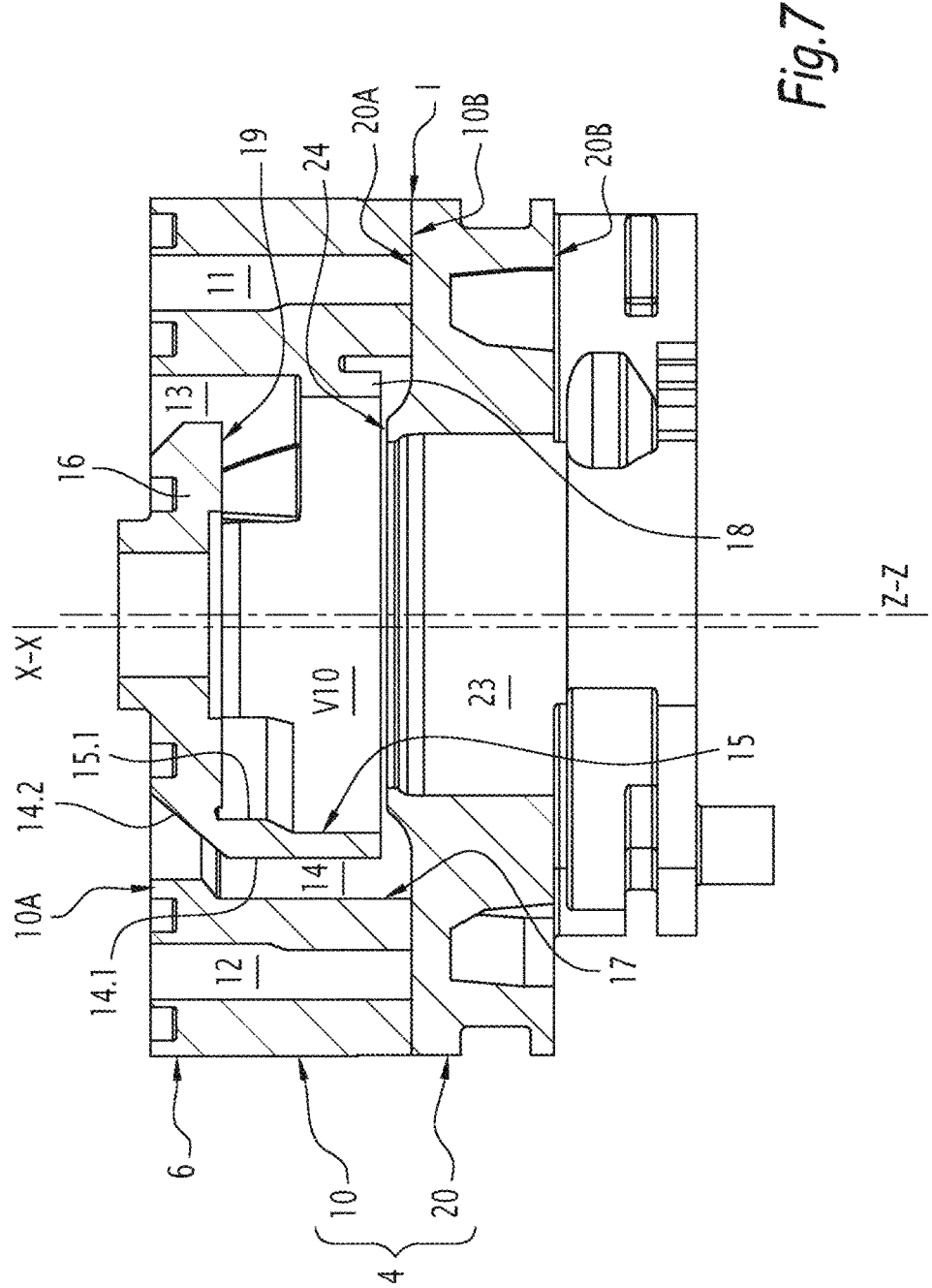
FIG. 7 is a view similar to FIG. 3, showing only the base of the cartridge.

For convenience, the rest of the description is oriented relative to the axis X-X, considering that the terms "upper", "top" and the like correspond to an axial direction turned toward the upper part of FIGS. 3, 6 and 7, while the terms "lower", "bottom" and the like correspond to an axial direction in the opposite sense.

The thermostatic cartridge 1 includes an upper housing 2 and a lower base 4, which, in the assembled state of the cartridge, are fixedly assembled to one another.

The base 4 has a globally cylindrical outer shape, while having an outer peripheral face 6 that is cylindrical and centered on the axis X-X. The axis X-X is thus defined by the outer periphery of the base and can therefore be described as base axis. In the example considered here, the cylindrical outer face 6 of the base 4 has a circular base.

As clearly shown in FIGS. 1 to 3, 6 and 7, the base 4 considered here primarily includes two separate parts that are arranged one above the other along the axis X-X, i.e., an upper part 10 and a lower part 20. In the example embodiment shown in the figures, the cylindrical outer face 6 is distributed over the upper 10 and lower 20 parts of the base, having noted that in an alternative that is not shown, only the upper part 10 may delimit the outer periphery of the base. In all cases, each of the base parts 10 and 20 has an upper outer face 10A, 20A and, axially opposite the latter, a lower outer face 10B, 20B. In the assembled state of the cartridge 1 and therefore in the assembled state of the base 4, the base parts 10 and 20 are axially superimposed so as to be fixed on one another, the lower face 10B of the upper part 10 covering the upper face 20A of the lower part 20, while being in direct contact with the latter. Thus, as clearly shown in FIGS. 3, 6 and 7, the lower face 10B of the upper part 10 and the upper face 20A of the lower part 20 are axially pressed against one another such that part of this face 10B and part of this face 20A are in axial contact with one another and thus form a junction interface I between the base parts 10 and 20. This junction interface I extends transversely to the axis X-X. In the example embodiment considered in the figures, this interface I extends essentially perpendicular to the axis X-X, the respective parts in contact with one another of the lower face 10B of the base part 10 and the upper face 20A of the base part 20 being planar and extending perpendicular to the axis X-X.

As will be explained in more detail hereinafter, because the hot water and the cold water flow through the base, between the lower face 20B of the lower part 20 and the upper face 10A of the upper part 10, the junction interface I is provided to be sealed in that the material contact zones between the lower face 10B of the base part 10 and the upper face 20A of the base part 20 are sealed, while prohibiting the passage of fluid through these contact zones. In other words, the respective parts forming the interface I of the spaces 10B and 20A are in sealed contact with one another, no liquid being able to flow, via the contact interface of these parts, between the base parts 10 and 20. One possibility for sealing this interface I is to attach a flat seal, gripped axially between the base parts 10 and 20. Another solution, which limits the bulk in the direction of the axis X-X, is that this sealing is done by a material connection between the base parts 10 and 20. In practice, such a material link between the base parts 10 and 20 is done by glue or, preferably, by welding of the base parts 10 and 20 to one another: thus, according to one preferred embodiment, the base parts 10 and 20 are each made in one piece from plastic and are welded at their sealed junction interface, in particular laser welded, the plastic material of one of these base parts 10 and 20 being transparent while the plastic material of the other is opaque at the wavelength of the welding laser used. Of course, various techniques other than laser welding can be considered so as, at their junction interface I, to weld the plastic materials making up the plastic parts respectively making up the base parts 10 and 20 directly to one another.

As clearly shown in FIGS. 1, 2, 4, 5 and 6, the upper base part 10 delimits, over its entire axial dimension, a cold water flow channel 11 and a hot water flow channel 12, each of these channels connecting the upper 10A and lower 10B faces of the base part 10 to one another, while emerging on these upper and lower faces. Likewise, as clearly shown in FIGS. 1, 2 and 6, the lower base part 20 delimits, over its entire axial dimension, a cold water flow channel 21 and a hot water flow channel 22, each of these channels connecting the upper 20A and lower 20B faces of the base part 20 to one another, while emerging freely on these upper and lower faces. As shown in FIG. 6, in the assembled state of the base 4, the cold water flow channels 11 and 21 are directly connected to one another, through the junction interface I, while emerging in one another at the axial level of this interface I. The same is true for the hot water flow channels 12 and 22. In other words, in the assembled state of the base 4, a cold water flow channel between the lower face 20B of the base part 20 and the upper face 10A of the base part 10 is formed jointly by the channels 11 and 21, while successively being delimited by the base parts 20 and 10 and while axially crossing the junction interface I. Likewise, a hot water flow channel between the faces 20B and 10A is formed jointly by the channels 12 and 22, while being delimited successively by the base parts 20 and 10 and while axially crossing the junction interface I.

Figure 2:
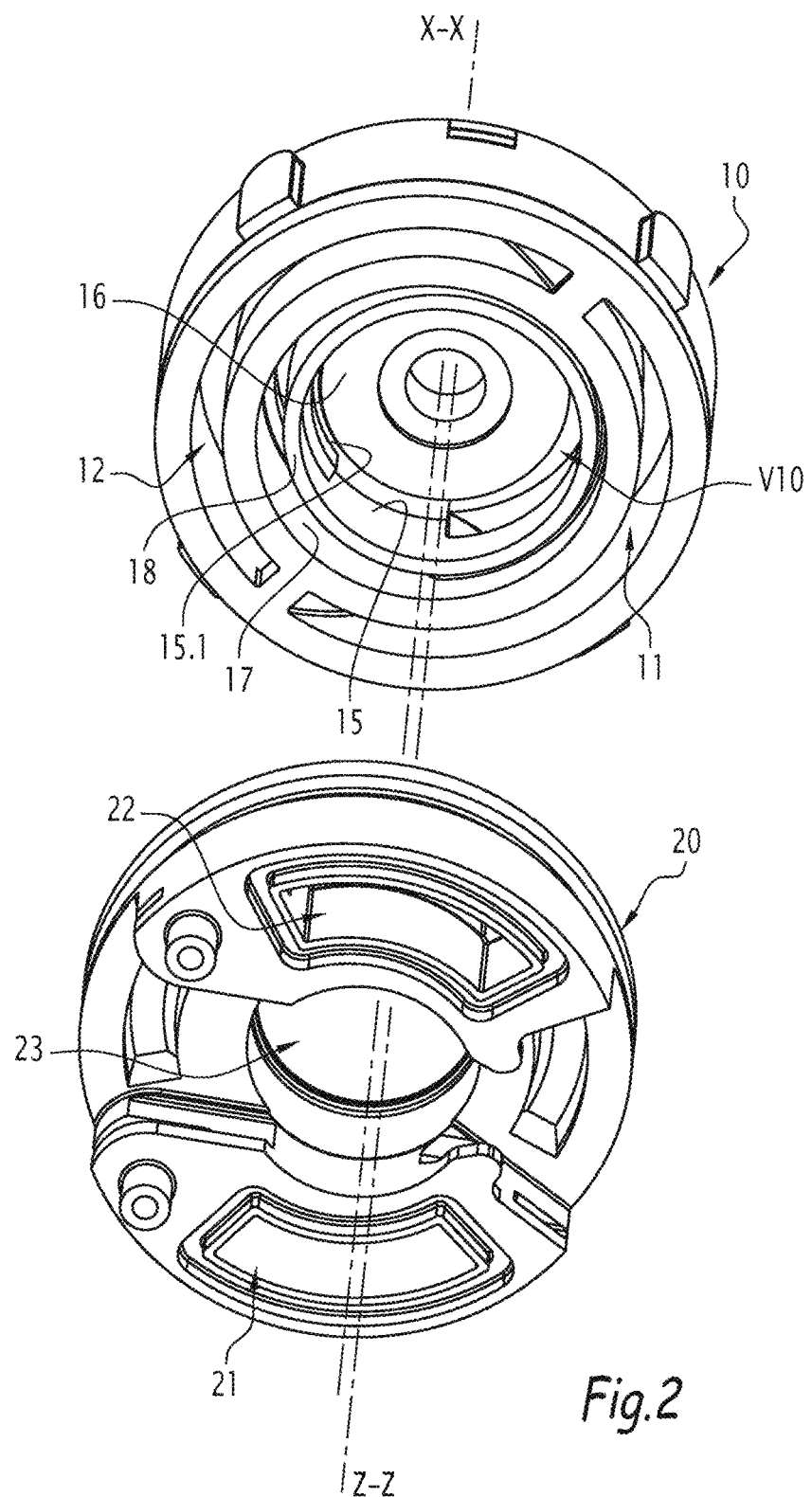
FIG. 2 is a view similar to FIG. 1, showing, from another viewing angle, a base of the cartridge.

As clearly shown in FIGS. 2 and 7, the upper base part 10 also delimits a free inner space V10, which is traversed by the axis X-X while being centered on an axis Z-Z separate from this axis X-X. The axes X-X and Z-Z are parallel to one another and offset relative to one another, their offset, i.e., the distance separating them in a plane perpendicular to them, being denoted d in FIGS. 4 and 5. On either side and separately from this inner space V10, the base part 10 further delimits a cold water inlet orifice 13 and a hot water inlet orifice 14, which, at their upper end, each emerge on the upper face 10A of the base part 10, while, at their lower end, these inlet orifices 13 and 14 emerge in the inner space V10, the lower end of the inlet orifice 14 being situated axially lower than that of the inlet orifice 13, as shown in FIGS. 3, 6 and 7.

The flow channels 11 and 12 and the inlet orifices 13 and 14 are positioned within the base part 10 so as not to communicate directly with one another. To limit the constraints of their arrangement and facilitate flows through the base part 10, the flow channels 11 and 12 are preferably opposite one another relative to the axis X-X. The same is true for the inlet orifices 13 and 14, having additionally noted that, for reasons that will appear later, the axis Z-Z is then advantageously offset, relative to the axis X-X, toward the inlet orifice 13, as clearly shown in FIGS. 3 to 7.

The lower base part 20 in turn delimits a mixing outlet orifice 23, which is substantially centered on the axis Z-Z and which connects the upper 20A and lower 20B faces of the base part 20 to one another, while emerging on these upper and lower faces. As clearly shown in FIGS. 2 and 6, the flow channels 21 and 22 and the outlet orifice 23 are positioned within the base part 20 so as not to communicate directly with one another.

The inner space V10 of the base part 10 emerges downwardly on the lower face 10B of the base part 10 such that, in the assembled state of the base 4, this inner space V10 is directly connected to the outlet orifice 23 of the base part 20 through the junction interface I, this space V10 and this outlet orifice 23 emerging directly in one another in a centered manner on the axis Z-Z.

During use, the flow channels 11 and 21 on the one hand and the flow channels 12 and 22 on the other hand are provided to be respectively supplied with cold water and hot water, from the lower face 20B of the lower base part 20, as indicated by arrows F1 and C1 in FIG. 6. Additionally, after having left the base 4 through the upper face 10A of its upper base part 10 and having flowed inside the housing 2 as mentioned in slightly more detail later, this cold water and this hot water are turned back, from the inside of the housing 2, toward the upper face 10A of the base part 10 so as to respectively supply the inlet orifices 13 and 14, as indicated by arrows F2 and C2 in FIGS. 3 and 6. This cold water and hot water, flowing downwardly in the inlet orifices 13 and 14, respectively, next supply the inner space V10 of the base part 10, in which they mix in the form of mixed water, which, as indicated by arrows M in FIGS. 3 and 6, pass from the inner space V10 to the outlet orifice 23 through the junction interface I. The mixture of the cold water and the hot water then leaves the base 4, while being discharged toward the bottom of the outlet orifice 23.

Figure 4:
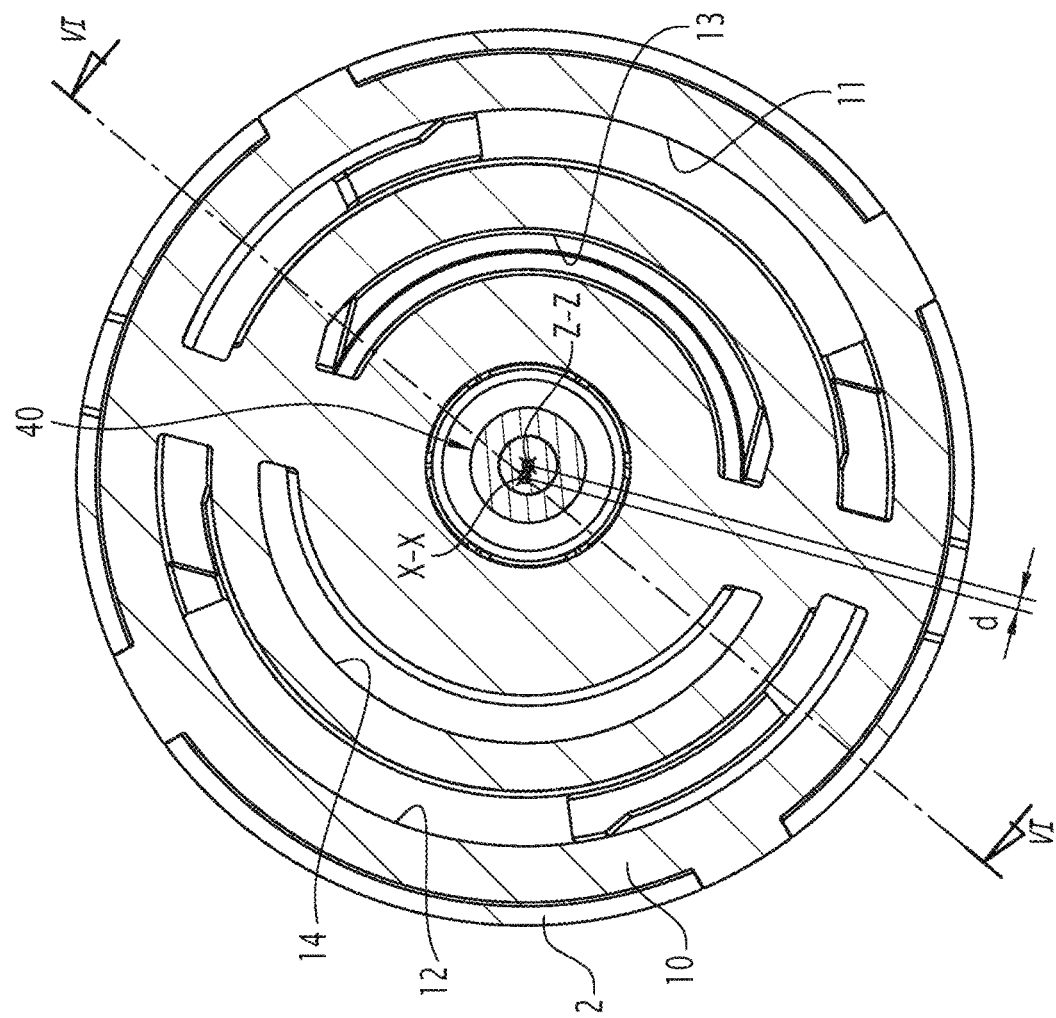
FIGS. 4 to 6 are sectional views respectively along line IV-IV of FIG. 3, line V-V of FIG. 3 and line VI-VI of FIG. 4.
Figure 5:
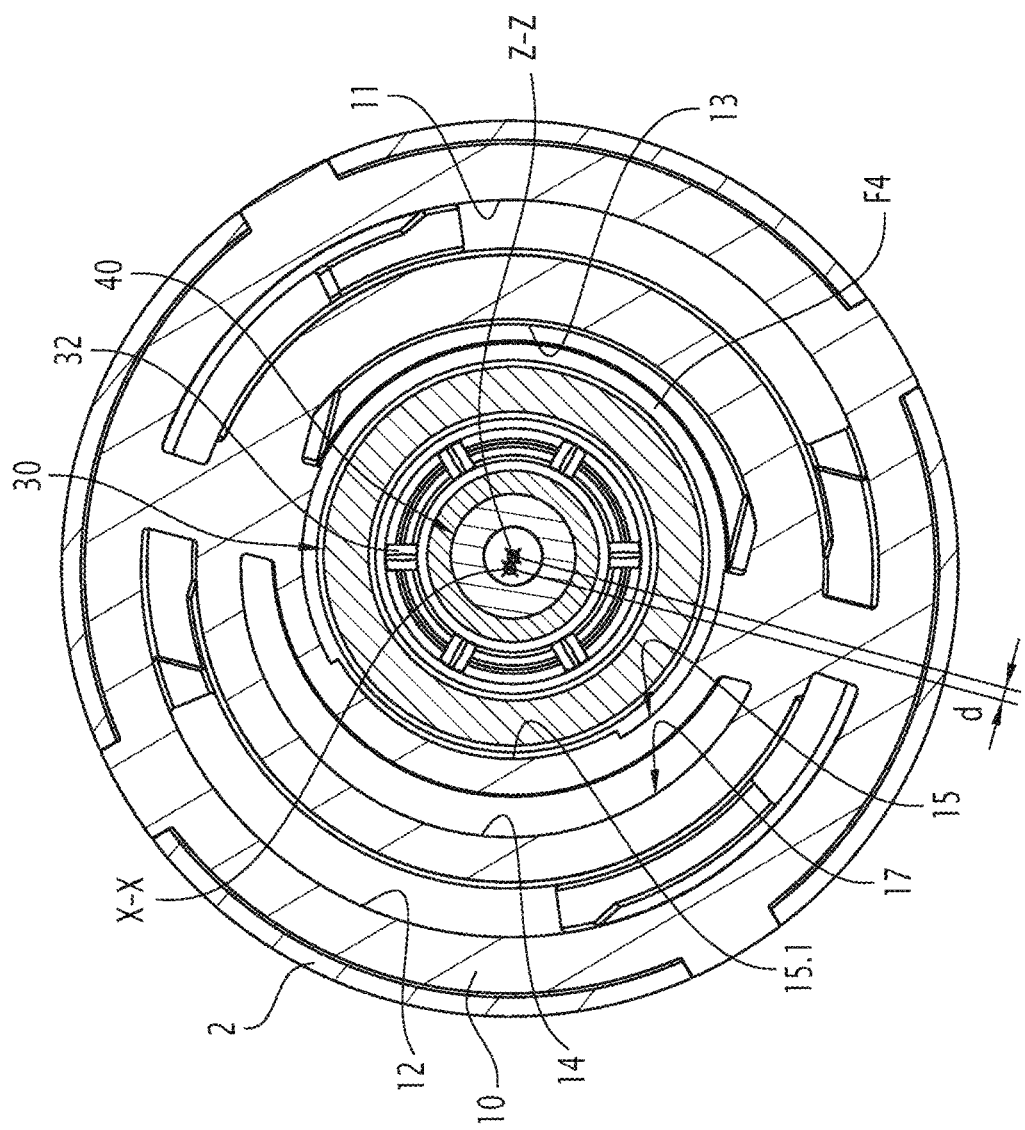

Advantageously, in particular to maximize the cold water and hot water flow rates respectively flowing in the inlet orifices 13 and 14, those inlet orifices 13 and 14 each extend over approximately 180° around the axis Z-Z, while being diametrically opposite one another, as clearly shown in FIGS. 4 and 5.

As shown in FIGS. 2, 3, 6 and 7, the inner space V10 of the base part 10 is stepped in the direction of the axis Z-Z, while being more radially extended in its lower part than in its upper part. More specifically, in its upper part, the inner space V10 is delimited by a substantially cylindrical surface 15, which is centered on the axis Z-Z, which has a circular base, and which extends axially downward from the outer periphery of the lower surface of a wall 16 belonging to the upper part of the base 10, this wall 16 axially upwardly closing the inner space V10. This cylindrical surface 15 extends over 360° around the axis Z-Z, while being interrupted, around this axis, by the lower mouth of the cold water inlet orifice 13, as shown in the right part of FIGS. 3 and 6. In the example considered in the figures, the upper part of the surface 15 has, opposite the mouth of the inlet orifice 13, a portion 15.1 with a smaller radius than the rest of the surface 15, as clearly visible in FIGS. 2 and 5.

In its lower part, the inner space V10 is delimited by a cylindrical surface 17, which is centered on the axis Z-Z, which has a circular base and which has a diameter strictly larger than that of the cylindrical surface 15. In the example embodiment considered in the figures, the cylindrical surfaces 15 and 17 are connected to one another by a stepped wall 18, which, in its peripheral part connected to the cylindrical surface 17, is advantageously upwardly hollowed out. In the direction of the axis Z-Z, the cylindrical surface 17 extends downward to the lower face 10B of the base part 10, on which this cylindrical surface 17 emerges. Around the axis Z-Z, the cylindrical surface 17 extends over 360°, advantageously without being interrupted by the hot water inlet orifice 14 at the mouth of the latter into the inner space V10: indeed, this inlet orifice 14 emerges primarily, or even, like here, exclusively, axially in the lower part of the inner space V10, the cylindrical surface 17 extending axially upward to delimit the wall and the inlet orifice 14, radially furthest from the axis Z-Z, as clearly shown in FIGS. 2, 3 and 5.

Before describing the other components of the cartridge 1, it will be noted that the stepped shape of the inner space V10 of the base part 10 allows this base part 10 to be obtained easily by molding plastic, in particular injected plastic. Indeed, during the manufacture of this base part 10 by molding, a molding core can advantageously be provided to occupy the inner space V10 such that, without using a retractable molding pin, the stripping of the base part 10 consists of a relative downward translation of the core, that stripping being particularly easy without any undercut.

Furthermore, as clearly shown in FIGS. 3, 6 and 7, the diameter of the cylindrical surface 17 is strictly larger than the diameter of the outlet orifice 23, in particular the mouth of the latter on the upper face 20A of the base part 20. It will therefore be understood that, in the assembled state of the base 4, the lower end of the cylindrical surface 17 is connected to the outlet orifice 23 by a solid part of the upper surface 20A of the base part 20.

The cartridge 1 also includes a spool 30 which, as clearly shown in FIGS. 3, 5 and 6, has a globally tubular shape, with a circular base and centered on an axis which, in the assembled state of the cartridge, is aligned with the axis Z-Z, the latter also being able to be described as spool axis. This spool 30 has an upper outer face 30A and a lower outer face 30B, as well as a lateral outer face 30C, which connects the upper 30A and lower 30B faces to one another. This lateral face 30C is substantially cylindrical, while being centered on the axis Z-Z and having a circular base, its diameter being substantially equal to that of the cylindrical surface 15 of the base part 10. Inside this lateral face 30C, a peripheral groove is hollowed out inside which a sealing gasket 31 is received.

The spool 30 is mounted on the base 4, more specifically inside the inner space V10 of the base part 10, movably along the axis Z-Z between two extreme positions, i.e.:

an extreme high position, in which the upper face 30A of the spool 30 bears against a seat 19, which is secured to the base part 10, while being centered on the axis Z-Z, and the outside of which is supplied by the cold water leaving the inlet orifice 13, having noted that, in the example embodiment considered here, this seat 19 is delimited by the lower surface of the upper wall 16 of the base part 10; and an extreme low position, in which the lower face 30B of the spool 30 bears against a seat 24, which is secured to the base part 20, while being centered on the axis Z-Z, and the outside of which is supplied by the hot water leaving the inlet orifice 14, having noted that, in the example embodiment considered here, this seat 24 is delimited by the upper face 20A of the base part 20, while being provided upwardly axially protruding from the rest of this upper face 20A.

The total axial dimension of the spool 30, separating its opposite faces 30A and 30B from one another, is smaller than the axial distance separating the seats 19 and 24 from one another. Consequently, when the spool 30 is in its extreme low position, the spool closes off a hot water intake inside the seat 24, by concentric axial bearing centered on the axis Z-Z of an outer peripheral strip of the lower face 30B of the spool against the seat 24, while maximally opening a cold water passage F3, which is centered on the axis Z-Z and which is axially delimited between the upper face 30A of the spool 30 and the seat 19. Conversely, when the spool is in its extreme high position, the spool closes off a cold water intake inside the seat 19, by concentric axial bearing centered on the axis Z-Z of an outer peripheral strip of the upper face 30A of the spool against the seat 19, while maximally opening a hot water passage C3, which is centered on the axis Z-Z and which is axially delimited between the lower face 30B of the spool 30 and the seat 24. Of course, depending on the position of the spool 30 along the axis X-X between its upper and lower extreme positions, the respective flow sections of the cold water passage F3 and the hot water passage C3 vary inversely, which means that the quantities of cold water and hot water allowed inside the seats 19 and 24 are controlled, in inverse respective proportions, by the spool 30 depending on its axial position. In FIGS. 3 and 6, the spool 30 occupies an intermediate axial position between its upper and lower extreme positions.

By offsetting the axis Z-Z, relative to the axis X-X, toward the inlet orifice 13, the outer diameter of the spool 30 can be maximized, in particular at outer peripheral strips of its upper 30A and lower 30B faces, which respectively delimit the passages F3 and C3 with the seats 19 and 24. Thus, in particular without changing the position and the dimensions of the inlet orifice 14 compared to a cartridge of the prior art in which the axes X-X and Z-Z are aligned, the outer diameter of the spool 30 can be increased up to twice the value d of the offset between the axes X-X and Z-Z, having noted that this value d is advantageously provided to reach at least one one-hundredth of the diameter of the outer peripheral face 6 of the base 4, or even more. As explained at the beginning of this document and taking the preceding into account, it is understood that by increasing the outer diameter of the spool, one increases the radial diameter of the passages F3 and C3, and thus the flow section of these passages. By way of non-limiting example, for a test of the cartridge 1 whose outer peripheral face 6 has a diameter of 35 mm, the offset d was done with a value of 0.5 mm: the outer diameter of the spool 30 was able to be increased by 1 mm relative to its value within a cartridge of the prior art in which the axes X-X and Z-Z are aligned, thereby increasing the maximum acceptable flow rate through the cartridge 1 by about 10%.

It will also be noted that the off-centering and the increase in diameter of the spool may lead to decreasing the flow section of the inlet orifice 13, which is not, however, detrimental to the performance of the cartridge 1 in terms of maximum allowable flow rate, because this orifice 13 is less constrained in terms of radial dimension than the orifice 14 in that the latter must bypass the spool 30 to join the lower passage C3 while the orifice 13 directly joins the passage F3. In practice, this "rebalancing" between the respective flow sections of the inlet orifices 13 and 14, resulting from the increase in diameter and the offsetting of the spool 30, can be done until the respective minimum flow sections of the orifices 13 and 14 are substantially equal to one another.

Advantageously, the seats 19 and 24, and therefore the outer peripheral strips of the upper 30A and lower 30B faces of the spool 30, which are respectively associated with these seats, have substantially equal relative diameters, which limits the pressure differentials between the upper 30A and lower 30B faces of the spool.

To ensure guiding of the movable assembly of the spool 30 in the inner space V10 of the base part 10, the side face 30C of the spool is received in a substantially adjusted manner inside the cylindrical surface 15, with radial interposition of the sealing gasket 31 to prevent any mixing between the cold water and the hot water upstream from the spool. Furthermore, in order for the cold water allowed inside the seat 19 to be able to reach and mix with the hot water allowed inside the seat 24, then forming the aforementioned mixture of cold water and hot water flowing, downstream from the spool 30, to the outlet orifice 23, the spool 30 inwardly delimits one or more flow passages 32 connecting its upper 30A and lower 30B faces to one another. This or these flow passage(s) 32, which are visible in FIGS. 5 and 6, are not limiting on the present invention and will therefore not be described in more detail.

Below the sliding and tight bearing zone of the spool 30 against the cylindrical surface 15 of the bae part 10, the hot water coming from the inlet orifice 14 supplies the seat 24 via a channel C4 for distributing hot water around the spool 30. This hot water distribution channel C4 is formed between the base parts 10 and 20, substantially at the axial level of the junction interface I: in the example embodiment considered in the figures, the distribution channel C4 is downwardly delimited by the upper face 20A of the base part 20, more specifically by the solid part of this face 20A extending, radially to the axis Z-Z, from the lower end of the cylindrical surface 17 to the seat 24, whereas upwardly, the distribution channel C4 is delimited hollowed out in the lower face 10B of the base part 10, more specifically by the cylindrical surface 17 as well as by the stepped wall 18. Thus, the hot water flowing in the inlet orifice 14 flows in the hot water distribution channel C4, while being distributed all around the spool 30 due to the fact that the cylindrical surface at 17 extends over 360° around the axis Z-Z, so as to distribute the supply from the hot water passage C3 over the entire outer periphery of the spool. Since the diameter of the cylindrical surface 17 can be dimensioned with a large value, without being constrained by manufacturing difficulties of the base 4 if the latter had been made in a single piece, it will be understood that the passage section for the hot water in the distribution channel C4 can be provided to be particularly large, thereby favoring the flow of a high hot water flow rate through the base 4.

In the extension of the foregoing considerations, due to the fact that the hot water inlet orifice 14 emerges primarily, or even exclusively, axially in the distribution channel C4, while being delimited by the cylindrical surface 17 with a large diameter, it will be understood that, advantageously, this inlet orifice 14 also has a large passage section for the hot water, while being particularly distant from the axis Z-Z. In practice, like in the example embodiment considered in the figures, the major part 14.1 of the inlet orifice 14, connecting its upper mouth to the distribution channel C4, may be radially more separated from the axis Z-Z than its upper mouth, the radial position of the latter being able to be constrained by the presence of sealing elements on the upper face 10A of the base part 10 and/or by the connecting specificities of this upper face 10A to the inner arrangements of the housing 2. In this case, as an advantageous option, the base part 10 inwardly has a surface 14.2 deflecting the flow of hot water between the upper mouth of the inlet orifice 14 and the major part 14.1 of this inlet orifice 14.

According to one advantageous optional arrangement, which is implemented in the example embodiment considered in the figures, a channel F4 for distributing the cold water around the spool 30 can be provided above the sliding and sealed bearing zone of the spool 30 against the cylindrical surface 15 of the base part 10. As clearly shown in FIGS. 3 and 6, this distribution channel F4 is jointly delimited by the upper part of the cylindrical surface 15 and the upper part of the lateral face 30C of the spool 30, this upper part of the lateral face 30C advantageously being hollowed out as explained in FR 2,983,985, to which the reader may refer for more details. Advantageously, this distribution channel F4 runs over 360° around the axis Z-Z, while being slightly choked by the portion 15.1 of the surface 15 opposite the outlet of the orifice 13 in this channel F4, as shown by FIG. 5.

To drive the movement of the spool 30 and thus control its axial position, the thermostatic cartridge 1 also includes a thermostatic element 40 whereof the body 41, which is centered on the axis Z-Z in the assembled state of the cartridge, is fixedly secured to the spool 30. This body contains a thermodilatable material which, under the action of the heat from the mixture of hot water and cold water, flowing downstream from the spool 30 along this body 41, extends and causes the relative movement, in translation along the axis Z-Z, of a piston 42 of the thermostatic element 40, that piston 42 itself also being substantially centered on the axis Z-Z in the assembled state of the cartridge.

The terminal part of the piston 42 opposite the body 41, in other words the upper terminal part of the piston 42, is connected to the base 4 by a mechanical assembly 50, which is housed inside the housing 2 and which, in a known manner, is able to adjust the axial altitude of the piston 42 relative to the base 4, independently of the relative position of the body 41: this means that this mechanical assembly 50 is designed to control the temperature of the mixture of cold water and hot water leaving the base 4, by adjusting the thermostatic equilibrium temperature around which the temperature of the mixture is controlled. Since the embodiment of the mechanical assembly 50 is not limiting on the present invention, this mechanical assembly 50 is not shown in detail in the figures and will not be described in more detail here, having nevertheless noted that, in the example embodiment considered in the figures, this mechanical assembly 50 is advantageously suitable for also controlling the flow rate of the mixture of cold water and hot water leaving the base 4, by adjusting, typically using ceramic discs, the placement in communication of the cold water flow channel 11 with the cold water inlet orifice 13 and the placement in the communication of the hot water flow channel 12 with the hot water inlet orifice 14. Preferably and as is also the case for the example embodiment considered in the figures, the mechanical assembly 50 includes a single lever 51 allowing the user to control the flow rate and temperature of the mixture. In this respect, the reader may refer, for example, to prior art documents WO 2010/072966 and WO 2015/052098.

The cartridge 1 further includes a compression spring 60. This spring 60 acts on the spool 30 so as to oppose the deployment of the piston 42 relative to the body 41 of the thermostatic element 40, while being axially inserted between this spool and the base 4, more specifically between this spool and a piece 70, fixedly attached to the base part 20, through the lower mouth of the outlet orifice 23.

Of course, the invention is not limited to the embodiment described thus far and illustrated, various alternatives and options being able to be considered. As examples:
- rather than protruding from the upper face 20A of the base part 20, the seat 19 may be provided to be substantially flush with the rest of this upper face 20A; in this case, the lower part of the spool 30 is extended by an ad hoc wall, for example frustoconical and diverging downward, the lower end of which can cooperate with the seat for the opening-closing of the hot water passage C3;
- rather than extending over 360° around the axis X-X, the hot water distribution channel C4 can have a smaller circumferential span, to the detriment of a distribution of hot water all around the drawer 30; the same is true for the cold water distribution channel F4; and/or
- rather than making the base 4 in two parts like the parts 10 and 20 outlined thus far, the base 4 may, in an alternative that is not shown, be made like in WO 2014/135614, i.e., including a main body and an attached part, which is fixedly connected to this main body and, if applicable, against which the return spring associated with the thermostatic element of the cartridge bears; in this case, the fluid circulations, respectively provided by the parts 10 and 20 of the base 4 considered above, are provided, from a functional perspective, respectively by an upper part of the aforementioned main body and by the assembly formed by the rest of this main body and the aforementioned attached part.

What is claimed is:

1. A thermostatic cartridge for controlling cold and hot fluids to be mixed, comprising:
   a base, which defines a base axis on which an outer peripheral face of the base is centered, and which includes first and second base parts that follow one another along the base axis, each of the first and second base parts having a first axial face turned away from the other base part,
   this first base part delimiting a first inlet orifice for a first of the cold and hot fluids, as well as a second inlet orifice for the second fluid, the first and second inlet orifices emerging separately on the first face of the first base part,
   and the second base part delimiting an outlet orifice for a mixture of the cold and hot fluids, emerging on the first face of the second base part;
   a thermostatic element, which includes a piston, connected to the base, and a body, containing a thermodilatable material and positioned in the outlet orifice, the piston and the body being movable relative to one another parallel to the base axis under effect of an expansion of the thermodilatable material; and
   a spool for regulating the temperature of the mixture,
   the spool defining a spool axis that is both parallel to the base axis and offset relative to the base axis so as to define a predetermined offset between the base axis and the spool axis,
   the spool having first and second opposite axial faces, respectively turned toward the first face of the first and second base parts, and
   the spool being connected to the thermostatic element to be moved along the spool axis inside the first base part so as to inversely vary respective flow cross-sections of a first passage for the first fluid and of a second passage for the second fluid,
   wherein the first passage extends around the spool axis, is centered on the spool axis, and is axially delimited between the first face of the spool and the first base part, the first passage being supplied with the first fluid from the first inlet orifice,
   and wherein the second passage extends around the spool axis, is centered on the spool axis, and is axially delimited between the second face of the spool and the second base part, the second passage being supplied with the second fluid from the second inlet orifice.

2. The cartridge according to claim 1, wherein the predetermined offset is equal to at least one one-hundredth of a diameter of the outer peripheral face of the base.

3. The cartridge according to claim 1, wherein the first inlet orifice and the second inlet orifice are opposite one another relative to the base axis, and in that the spool axis is offset, relative to the base axis, toward the first inlet orifice.

4. The cartridge according to claim 1, wherein the first inlet orifice and the second inlet orifice are centered on the spool axis, extend over about 180° around the spool axis, and are diametrically opposed.

5. The cartridge according to claim 1, wherein the first inlet orifice and the second inlet orifice have respective flow cross-sections that have equal values.

6. The cartridge according to claim 1, wherein the first and second base parts are separate from one another and are axially superimposed fixedly on one another, such that second axial faces respectively of the first base part and the second base part, which are respectively opposite their first face, are applied axially against one another and thus include respective parts, in axial contact with one another, which form a junction interface between the first and second base parts, which is sealed and at which a distribution channel for the second fluid around the spool is formed between the first and second base parts.

7. The cartridge according to claim 6,
   wherein the first base part inwardly has a first cylindrical surface, which is centered on the spool axis, on which the first inlet orifice radially emerges and which delimits a channel for distributing the first fluid around the spool,
   and wherein the first base part inwardly has a cylindrical second surface, which is centered on the spool axis, a diameter of which is strictly larger than a diameter of the first cylindrical surface, and which extends axially from the second face of the first base part toward the first face of this first base part, while successively delimiting the distribution channel for the second fluid and the second inlet orifice.

8. The cartridge according to claim 6, wherein the second inlet orifice emerges on the first face of the first base part through a mouth of the second inlet orifice, and wherein the second inlet orifice includes a connecting part between said mouth and the distribution channel for the second fluid, the connecting part of the second inlet orifice being radially further away from the spool axis than said mouth.

9. The cartridge according to claim 6, wherein the first and second base parts are each made from a plastic part and wherein the plastic materials making up the respective parts of the second face of the first base part and the second face of the second base part, which form the junction interface, are welded to one another so as to seal this junction interface.

10. The cartridge according to claim 6, wherein the respective parts of the second face of the first base part and the second face of the second base part, which form the junction interface, are provided with seals and/or sealing gaskets so as to seal this junction interface.

11. The cartridge according to claim 6,
wherein a flow channel for the first fluid from the first face of the second base part to the first face of the first base part is formed jointly by a first flow channel of the first fluid, delimited by the first base part and connecting the first and second faces of the first base part to one another, and by a second flow channel for the first fluid, delimited by the second base part and connecting the first and second faces of the second base part to one another, these first and second flow channels of the first fluid being directly connected to one another while emerging in one another at the junction interface, and wherein a flow channel for the second fluid from the first face of the second base part to the first face of the first base part is formed jointly by a first flow channel of the second fluid, delimited by the first base part and connecting the first and second faces of the first base part to one another, and by a second flow channel for the second fluid, delimited by the second base part and connecting the first and second faces of the second base part to one another, these first and second flow channels of the second fluid being directly connected to one another while emerging in one another at the junction interface.

12. The cartridge according to claim 6, wherein the junction interface is transverse to the axis.

13. The cartridge according to claim 6, wherein the junction interface is planar and extends perpendicular to the axis.

* * * * *